US012618863B2

(12) United States Patent (10) Patent No.: US 12,618,863 B2
Meyer et al. (45) Date of Patent: May 5, 2026

(54) ALGORITHM FOR INDEPENDENT DETECTION OF PROBE BLOCKAGES

(71) Applicant: Rosemount Aerospace Inc., Burnsville, MN (US)

(72) Inventors: Jacob Meyer, New Prague, MN (US); Jacob Brown, Minnetonka, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 320 days.

(21) Appl. No.: 18/582,017

(22) Filed: Feb. 20, 2024

(65) Prior Publication Data

US 2025/0264494 A1     Aug. 21, 2025

(51) Int. Cl.
    *G01P 5/165*       (2006.01)
    *G01P 21/00*       (2006.01)
(52) U.S. Cl.
    CPC ............. *G01P 5/165* (2013.01); *G01P 21/00* (2013.01)
(58) Field of Classification Search
    CPC ... G01F 1/46; B64D 43/02; G01P 5/14; G01P 5/16; G01P 5/165; G01P 21/00
    See application file for complete search history.

(56) References Cited

U.S. PATENT DOCUMENTS 6,205,376 B1 * 3/2001 Gordon ..................... G01P 5/16
                                                          701/4
7,984,647 B2  7/2011 Severson et al.
8,718,955 B2  5/2014 Golly et al.

9,021,856 B2   5/2015 Leblond et al.
10,124,901 B2  11/2018 Clemen et al.
10,913,545 B2 * 2/2021 Boelke .................... G01P 5/165
10,948,511 B2  3/2021 Gordon et al.
11,003,196 B2  5/2021 Li et al.
                    (Continued)

FOREIGN PATENT DOCUMENTS

EP      3623818 A1    3/2020
FR      2882141 A1 *  8/2006  ................ G01P 5/14
                    (Continued)

OTHER PUBLICATIONS

Extended European Search Report for European Patent Application No. 25159221.8, dated Jul. 28, 2025, 16 pages.

*Primary Examiner* — John Fitzgerald
(74) *Attorney, Agent, or Firm* — Kinney & Lange, P.A.

(57)                ABSTRACT

A blockage detection system for detecting aircraft probe blockages includes a processor, a communication device, and computer-readable memory. The computer-readable memory encoded with instructions that, when executed by the processor, cause the system to execute a blockage detection algorithm. The processor receives a static pressure and an impact pressure from one or more aircraft probes. The processor converts the static pressure and the impact pressure to a correlating variable, via the blockage detection algorithm. The processor evaluates the correlating variable, via the blockage detection algorithm, to determine if a value of the correlating variable exceeds a threshold indicative of a blockage. The processor outputs a blockage indicator, to a receiving system in response to the correlating variable exceeding the first threshold indicative of a blockage. The processor is further able to determine if the blockage has cleared by reference to an external comparative pressure measurement.

20 Claims, 5 Drawing Sheets

(56)     References Cited

U.S. PATENT DOCUMENTS

| | | | | |
|---|---|---|---|---|
| 11,035,877 | B2 * | 6/2021 | Oltheten | G01P 5/165 |
| 11,215,631 | B2 | 1/2022 | Anderson et al. | |
| 11,472,568 | B2 | 10/2022 | Schwartz et al. | |
| 11,549,914 | B2 | 1/2023 | Veilleux et al. | |
| 11,662,362 | B2 | 5/2023 | Oltheten et al. | |
| 12,486,041 | B2 * | 12/2025 | Nadkarni | B64D 43/02 |
| 2008/0147255 | A1 * | 6/2008 | Alwin | B64D 43/02 |
| | | | | 701/14 |
| 2012/0123704 | A1 * | 5/2012 | Golly | G01P 21/025 |
| | | | | 702/50 |
| 2012/0180581 | A1 * | 7/2012 | Foster | G01P 21/025 |
| | | | | 73/865.6 |
| 2019/0178906 | A1 * | 6/2019 | Vadada | G01F 1/46 |
| 2021/0072281 | A1 | 3/2021 | Jayakumar et al. | |
| 2021/0302464 | A1 * | 9/2021 | Oltheten | G01P 5/165 |
| 2022/0258877 | A1 | 8/2022 | Li et al. | |

FOREIGN PATENT DOCUMENTS

| | | | | | |
|---|---|---|---|---|---|
| GB | 2478522 | A | * | 9/2011 | G01P 21/025 |
| JP | 2004294175 | A | | 10/2004 | |
| WO | WO-2011003963 | A2 | * | 1/2011 | G01P 5/165 |
| WO | 2016000008 | A1 | | 1/2016 | |

* cited by examiner

ALGORITHM FOR INDEPENDENT DETECTION OF PROBE BLOCKAGES

BACKGROUND

Aircraft can contain several air data probes for measuring parameters such as static and impact pressure. While measuring such parameters, air data probes are susceptible to various failure modes which can cause erroneous data readings or loss of air data readings altogether. One such failure mode is a probe blockage condition that can occur due to conditions such as icing, excessive moisture, volcanic ash, sand/dirt, insect nesting, and/or other such conditions. The erroneous nature or loss of such readings can have downstream impacts on systems within the aircraft that consume such readings. Therefore, it is desirable to have a system which indicates when such air data probes are in a failure mode, such that consuming systems do not rely on the erroneous readings.

SUMMARY

A blockage detection system for detecting aircraft probe blockages includes a processor. The system further includes a communication device operably connected to the processor. The system further includes computer-readable memory operably connected to the processor, the computer-readable memory encoded with instructions that, when executed by the processor, cause the system to perform the following steps. The system receives a static pressure and an impact pressure from one or more aircraft probes. The system converts the static pressure and the impact pressure to a correlating variable, via a blockage detection algorithm. The system evaluates the correlating variable, via the blockage detection algorithm, to determine if a value of the correlating variable exceeds a threshold indicative of a blockage. The system outputs a blockage indicator, via the communication device, to a receiving system in response to the correlating variable exceeding the first threshold indicative of a blockage.

A method for detecting aircraft probe blockages includes receiving a static pressure and an impact pressure from one or more aircraft probes. The method further includes converting the static pressure and the impact pressure to a correlating variable, via a blockage detection algorithm. The method further includes evaluating the correlating variable, via the blockage detection algorithm, to determine if a value of the correlating variable exceeds a threshold indicative of a blockage. The method further includes outputting a blockage indicator, via the communication device, to a receiving system in response to the correlating variable exceeding the first threshold indicative of a blockage.

DETAILED DESCRIPTION

The techniques of this disclosure utilize an algorithm housed within an air data computer to determine whether a pressure probe is experiencing a blockage. The system operates by applying a blockage detection algorithm. The blockage detection algorithm receives the static pressure and the impact pressure measured by, for example, a pitot-static probe, and converts such measured values to a single correlating variable. The system then evaluates the correlating variable to determine if it exceeds a threshold indicative of a blockage condition. The techniques of this disclosure do not rely on external sources to determine a blockage condition, and instead use probe measurements from the probe being evaluated to detect a blockage. Upon detecting a blockage, the system can conduct further analysis, using measurements received from one or more additional external probes, to determine whether the blockage has cleared.

Figure 1:
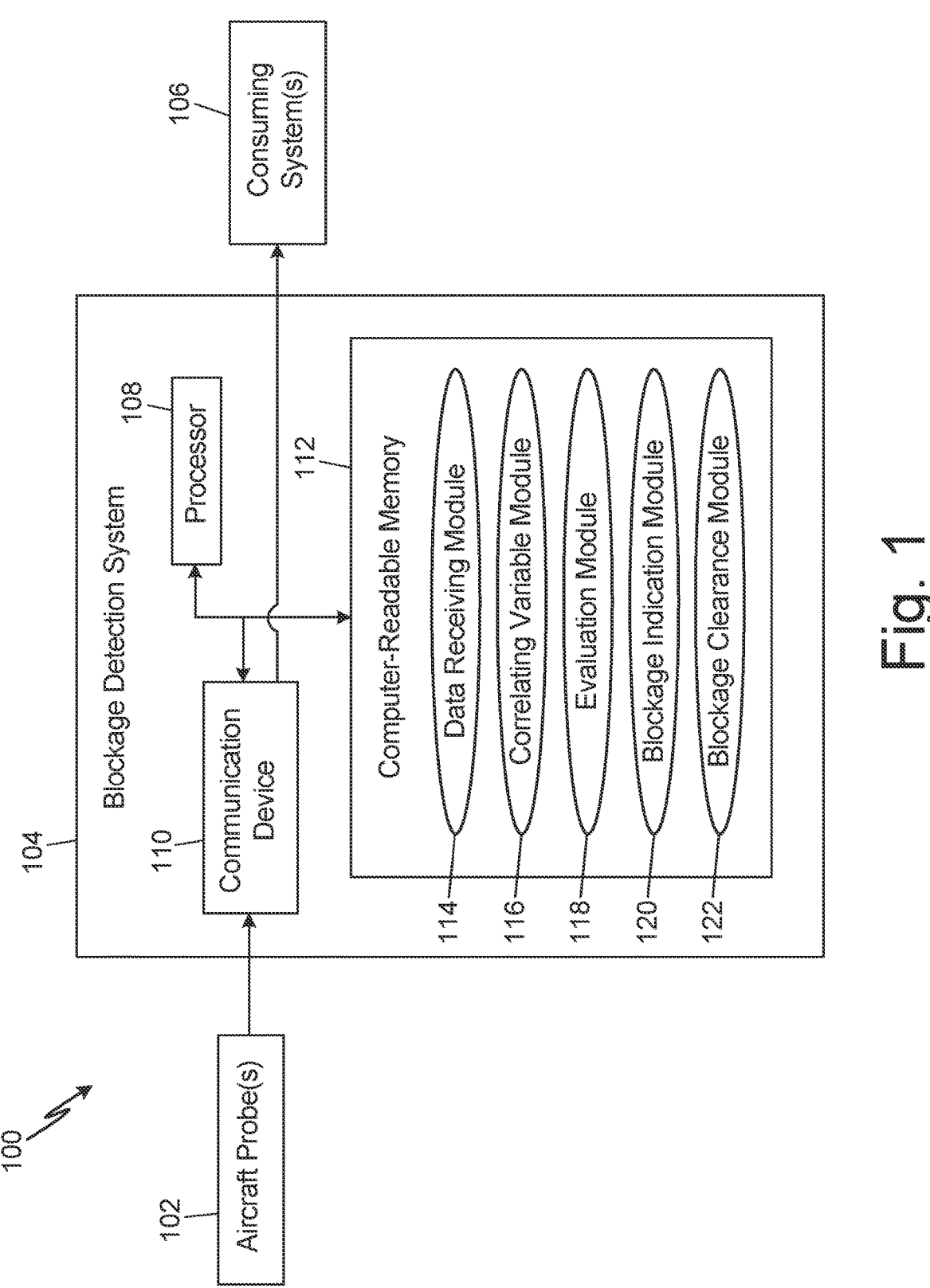
FIG. 1 is a diagram of a system for detecting a blockage on a probe.

FIG. 1 is a diagram of system 100 for detecting a blockage on a probe. System 100 includes aircraft probe(s) 102, blockage detection system 104, and consuming systems 106. Blockage detection system 104 includes processor 108, communication device 110, and computer readable memory 112. Computer readable memory includes a plurality of executable modules including data receiving module 114, correlating variable module 116, evaluation module 118, blockage indication module 120, and blockage clearance module 122.

Processor 108, in some examples, is configured to implement functionality and/or process instructions for execution within system 100. For instance, processor 108 can be capable of processing instructions stored in computer-readable memory 112. Examples of processor 108 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 112, in some examples, is described as computer-readable storage media. In some examples, a computer-readable storage medium includes a non-transitory medium. The term "non-transitory" indicates that the storage medium is not embodied in a carrier wave or a propagated signal. In certain examples, a non-transitory storage medium stores data that, over time, changes (e.g., in RAM or cache). In some examples, computer-readable memory 112 is a temporary memory, meaning that a primary purpose of computer-readable memory 112 is not long-term storage. Computer-readable memory 112, in some examples, is described as volatile memory, meaning that computer-readable memory 112 does not maintain stored contents when electrical power to computer-readable memory 112 is removed. Examples of volatile memories can include random access memories (RAM), dynamic random access memories (DRAM), static random access memories (SRAM), and other forms of volatile memories. In some examples, computer-readable memory 112 is used to store program instructions for execution by processor 108. Computer-readable memory 112, in one example, is used by software or applications to temporarily store information during program execution.

Computer-readable memory 112, in some examples, also includes one or more computer-readable storage media. Computer-readable memory 112 is configured to store larger amounts of information than volatile memory. Computer-readable memory 112 is further configured for long-term storage of information. In some examples, computer-readable memory 112 includes non-volatile storage elements. Examples of such non-volatile storage elements include, but are not limited to, magnetic hard discs, optical discs, flash memories, or forms of electrically programmable memories (EPROM) or electrically erasable and programmable (EE-PROM) memories.

Processor 108, communication device 110, and computer-readable memory 112 are interconnected within blockage detection system 104. Communication device 110 is operably connected to aircraft probe(s) 102. Communication device 110 is also operably connected to consuming system(s) 106. Blockage detection system 104 can be housed within a vehicle management computer, or within any other area with suitable computing power within the aircraft. In the depiction of system 100, blockage detection system 104 is depicted as external to aircraft probe(s) 102. It is understood, however, that in some embodiments (e.g., FIG. 2A), blockage detection system can be housed within aircraft probe(s) 102 when aircraft probe(s) 102 include, for example, one or more pitot-static probes comprising an air data computer.

In operation, computer-readable memory 112 is encoded with instructions that are executed by processor 108. Computer-readable memory 112 includes data receiving module 114. Data receiving module 114 includes one or more programs containing instructions to receive data from aircraft probe(s) 102 at blockage detection system 104. Upon execution of data receiving module 114, data (i.e., transmitted from aircraft probe(s) 102) is received and processed at blockage detection system 104 via communication device 110. Aircraft probe(s) can include various aircraft pressure sensors including, but not limited to, a pitot-static probe, a pitot-static probe having an in-built computing system, and/or separate pitot probe(s) and static pressure port(s). Blockage detection system 104 thus receives at least a static pressure measurement and an impact pressure measurement from aircraft probe(s) 102. In some embodiments, blockage detection system 104 can also receive at least a static pressure measurement and total pressure measurement from aircraft probe(s) 102, thereby making the impact pressure measurement derivable from the received parameters. In some embodiments, blockage detection system 104 can receive an impact pressure measurement and a total pressure measurement from aircraft probe(s) 102, thereby making the static pressure derivable.

Data receiving module 114 can be executed manually or at automated intervals. In one embodiment, blockage detection system 104 executes data receiving module 114 on a timed basis, wherein data transmitted from aircraft probe(s) 102 to blockage detection system 104 via communication device 110 and is collected or otherwise sampled on a predetermined sampling interval by blockage detection system 104 via execution of data receiving module 114.

Computer readable memory 112 further includes correlating variable module 116. Correlating variable module 116 includes one or more programs containing instructions to convert the received static pressure measurement and the received impact pressure measurement into a single correlating variable. Upon execution of correlating variable module 116, processor 108 uses a blockage detection algorithm to compute the correlating variable from the static pressure measurement and the impact pressure measurement. In some embodiments, the correlating variable is calculated, in part, by dividing the static pressure by the impact pressure. In some embodiments, the correlating variable is calculated, in part, by evaluating the derivative of the static pressure divided by the impact pressure with respect to time. In some embodiments, the correlating variable is further processed by converting the derivative of the static pressure divided by the impact pressure with respect to time into the frequency domain via power spectrum estimations. By analyzing the variable in the frequency domain, the blockage detection algorithm can process the signal to remove nuisance or noise data. Nuisance or noise data can be determined by examining flight test data and/or flight simulation data. In further embodiments, an additional differentiation can be added after the power spectrum estimations. Such an embodiment allows for effective removal of nuisance or noise data while the aircraft is on the ground.

Computer readable memory 112 further includes evaluation module 118. Evaluation module 118 includes one or more programs containing instructions to evaluate whether a blockage condition exists within the probe being evaluated. Upon execution of evaluation module 118, processor 108 uses predefined thresholds within the blockage detection algorithm to evaluate whether a blockage exists within the probe being evaluated. In some embodiments, processor 108 determines that a blockage exists if the correlating variable exceeds a threshold indicative of a blockage. The threshold indicative of the blockage can be determined, for example, by evaluating flight test data and/or flight simulation data. Further, the threshold indicative of the blockage can be specific to an architecture of the aircraft on which the probe is mounted. The threshold indicative of the blockage can additionally or alternatively be specific to the mounting location of the probe on the aircraft.

Computer readable memory 112 further includes blockage indication module 120. Blockage indication module 120 includes one or more programs containing instructions to output a blockage indicator upon a determination by processor 108 that a blockage exists. Upon execution of blockage indication module 120, processor 108 transmits a blockage indicator via communication device 106 to consuming system(s) 106. Additionally or alternatively, communication device 106 can send the blockage indicator to an aircraft avionics system including a vehicle management computer. The vehicle management computer can then direct the blockage indicator to one or more downstream consuming systems.

Computer readable memory 112 further includes blockage clearance module 122. Blockage clearance module 124 includes one or more programs containing instructions to determine if the blockage has cleared via the blockage detection algorithm. Upon execution of blockage clearance module 124, processor 108 receives a pressure measurement from an external aircraft probe via communication device 110. In some embodiments, the external aircraft probe is a static pressure port and/or a pitot pressure tube. In some embodiments the external aircraft probe is mounted on an opposite side of the aircraft as compared to the position of aircraft probe(s) 102.

Upon receiving the pressure measurement from the external aircraft probe, processor 108 determines if the blockage has cleared by evaluating whether the rate of change the pressure measurements of aircraft probe(s) 102 indicates a clearance, and whether the pressure measurement from the external aircraft probe is consistent with the measurements from aircraft probe(s) 102. The rate of change of the pressure measurements of aircraft probe(s) 102 can indicate a clearance when the rate of change shows a spike, as the measurement goes from a blocked condition (i.e., no change in pressure) to a clear condition (i.e., sharp change from blocked measurement to the true pressure measurement). The pressure measurement from the external aircraft probe can be used as an additional confirmation that the blockage has cleared. In some embodiments, the pressure measurement from the external aircraft probe is the sole indicator that the blockage has been cleared. Once the blockage has been cleared, processor 108 can output a blockage clearance indicator via communication device 110 to the vehicle management computer and/or consuming system(s) 106.

System 100 provides various advantages. Primarily, system 100 allows for detection of probe blockages without comparing measured and/or calculated parameters across channels and without the need for external sensors. Rather, system 100 relies on the measured static and impact pressures from the pitot-static probe, or from distinct pitot probes and static ports, to determine whether a pitot probe is experiencing a blockage. Further, system 100 does not require additional hardware to implement the blockage detection algorithm. Rather, existing hardware including one or more processors within a pitot-static probe or within a vehicle management computer. This allows for an unchanged weight and cost of manufacturing for the aircraft. Additionally, system 100 is customizable for use on a variety of aircraft with different sensor mounting configurations and flight envelopes. Because flight test data and/or simulation data can be used to calculate thresholds indicative of a blockage, system 100 is applicable across a variety of aircraft applications.

Additionally, system 100 provides the advantage of being effective during flight and while the aircraft is grounded. As described, power spectrum estimations can be used within the blockage detection algorithm to remove nuisance or noise data from the correlating variable. Further, as described, an additional differentiation added after the power spectrum estimations allows for the blockage detection algorithm to have enhanced efficacy in removing noise or nuisance data that can arise while the aircraft is on the ground. Thus, the accuracy of the correlating variable is enhanced by such an embodiment.

FIG. 2 is a schematic diagram of air data system architecture 200 including the algorithm for detecting a probe blockage. Air data system architecture 200 includes multi-function probe 202, multi-function probe 204, vehicle management computer 206, and consuming systems 208. Multi-function probe 202 includes pitot pressure tube 210, static pressure port 212, and computing device 214. Multi-function probe 204 includes pitot pressure tube 216, static pressure port 218, and computing device 220. Multi-function probe 202 is operably connected to multi-function probe 204. Multi-function probe 202 and multi-function probe 204 are operably connected to vehicle management computer 206. The connection of multi-function probe 202 and multi-function probe 204 to vehicle management computer 206 can be a digital connection or a pneumatic connection. Vehicle management computer 206 is connected to consuming systems 208.

In operation, multi-function probe 202 and multi-function probe 204 are mounted on an external surface of an aircraft. In some embodiments, multi-function probe 202 and multi-function probe 204 are mounted on opposite sides of the aircraft. Multi-function probe 202 is configured to sense an impact pressure via pitot pressure tube 210. Multi-function probe 202 is also configured to sense a static pressure via static pressure port 212. Upon sensing the static pressure and the impact pressure, computing device 214 can implement the blockage detection algorithm, as described above with respect to system 100, in order to determine if a blockage exists within pitot pressure tube 210.

Multi-function probe 204 is configured analogously to multi-function probe 202. Multi-function probe 204 is configured to sense an impact pressure via pitot pressure tube 216. Multi-function probe 204 is also configured to sense a static pressure via static pressure port 218. Upon sensing the static pressure and the impact pressure, computing device 220 can implement the blockage detection algorithm, as described above with respect to system 100, in order to determine if a blockage exists within pitot pressure tube 216.

While it is understood that the blockage detection algorithm is implemented analogously within both multi-function probe 202 and multi-function probe 204, an example scenario discussing the operation of the algorithm on multi-function probe 202 is described herein. The blockage detection algorithm can run on computing device 214 of multi-function probe 202. Computing device 214 can include a processor (e.g., processor 108), a communication device (e.g., communication device 110), computer readable memory (e.g., computer readable memory 112). The computer readable memory can include instructions for executing the blockage detection algorithm, and the processor can execute such instructions in order to determine if a blockage exists, and if an existing blockage has been cleared.

In operation, multi-function probe 202 measures data based upon the impact pressure measured by pitot pressure tube 210 and static pressure port 212. Computing device 214 then processes the received static pressure measurement and the received impact pressure measurement into a single correlating variable via execution of the blockage detection algorithm. As described, the correlating variable can be calculated, in part, by dividing the static pressure by the impact pressure and evaluating the derivative of the static pressure divided by the impact pressure with respect to time. The correlating variable can be further processed by converting the derivative of the static pressure divided by the impact pressure with respect to time into the frequency domain via power spectrum estimations. By analyzing the variable in the frequency domain, the blockage detection algorithm can process the signal to remove nuisance or noise data.

Computing device 214 evaluates, via the blockage detection algorithm, whether a blockage condition exists within pitot pressure tube 210 based upon whether the correlating variable exceeds a threshold indicative of a blockage. The threshold indicative of the blockage can be determined, for example, by evaluating flight test data, flight simulation data, or any combination thereof. Further, the threshold indicative of the blockage can be specific to an architecture of the aircraft on which the probe is mounted and/or can be specific to the mounting location of the probe on the aircraft.

Computing device 214 outputs a blockage indicator upon determining that a blockage exists. Computing device can transmit a blockage indicator to vehicle management computer 206. Vehicle management computer 206 can transmit the blockage indicator to consuming systems 208.

Computing device 214 evaluates whether the blockage has been cleared via the blockage detection algorithm. Computing device 214 receives a pressure measurement from an external aircraft probe, such as multi-function probe 204. In other embodiments, the external aircraft probe can be a static pressure port, a pitot pressure tube, or a pitot-static pressure sensor (e.g., without a computing device). In some embodiments the external aircraft probe is mounted on an opposite side of the aircraft as compared to the position of multi-function probe 202.

Upon receiving the pressure measurement from the external aircraft probe, processor 108 determines if the blockage has cleared by evaluating whether the rate of change the pressure measurements of multi-function probe 202 indicates a clearance, and whether the pressure measurement from the external aircraft probe is consistent with the measurements from multi-function probe 202. In some embodiments, processor 108 determines if the blockage has been cleared by only considering whether the pressure measurement from the external aircraft probe is consistent with the measurements from multi-function probe 202. Once the blockage has been cleared, processor 108 can output a blockage clearance indicator via computing device 214 to vehicle management computer 206. Vehicle management computer 206 can transmit the blockage clearance indicator to consuming systems 208.

Multi-function probe 204 can operate analogously to multi-function probe 202. Thus, in the case that multi-function probe 204 experiences a blockage, multi-function probe 202 can be used as the external aircraft probe to indicate when the blockage is cleared. In some embodiments, one multi-function probe, such as multi-function probe 202, is mounted on the aircraft and is connected to a static port, a pitot tube, and/or a pitot-static sensor that does not have an in-built processor, and such a connection is used to indicate when the blockage is cleared.

Air data system architecture 200 is a schematic representation of how the blockage detection algorithm can be used within an aircraft architecture, and thus exhibits the same advantages as those described with respect to system 100. Furthermore, air data system architecture 200 is advantageous because all the computing for the blockage detection algorithm is done within a pitot-static probe having an in-built processor (e.g., multi-function probe 202 and/or multi-function probe 204). As such, no external processing is required and thus the multi-function probe is able to self-identify as to when a blockage occurs.

Figure 2A:
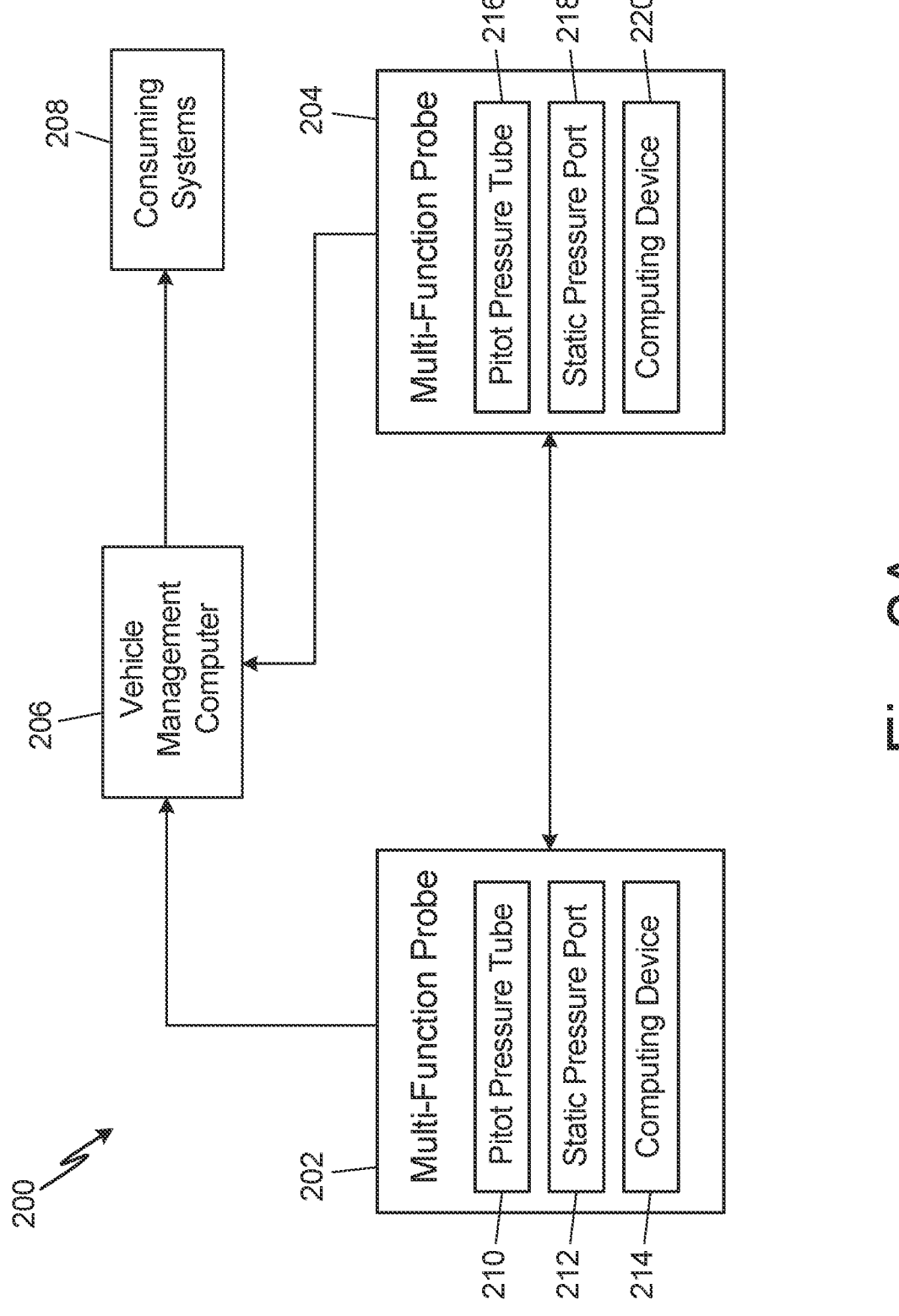
FIG. 2A is a schematic diagram of an air data system architecture including an algorithm for detecting probe blockage.
Figure 2B:
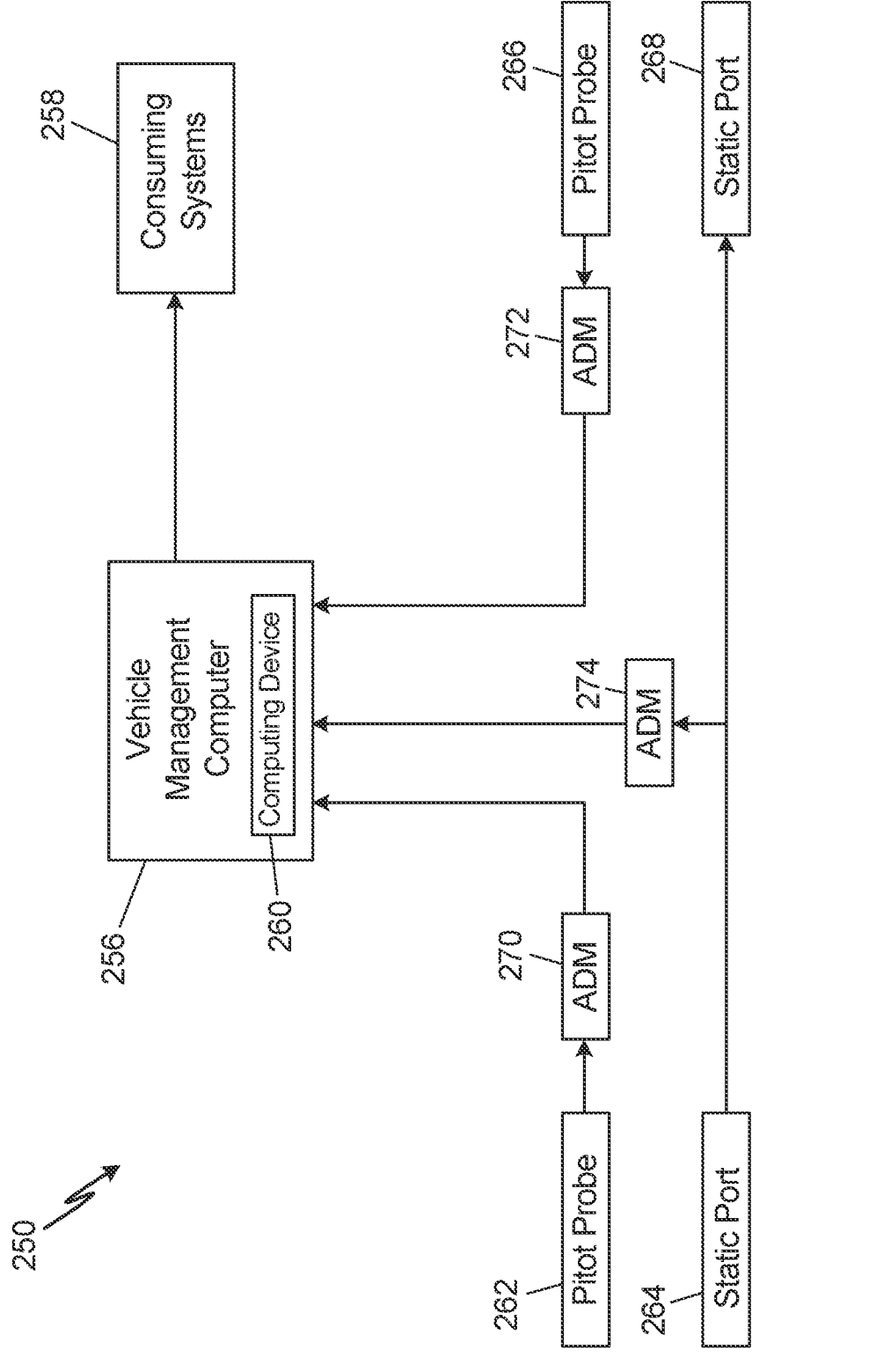
FIG. 2B is a schematic diagram of an alternative air data system architecture including the algorithm for detecting probe blockages.

FIG. 2B is a schematic diagram of air data system architecture 250 including the algorithm for detecting probe blockages. Air data system architecture 250 is an alternative embodiment to air data system architecture 200 as depicted in FIG. 2A. Air data system architecture 250 includes vehicle management computer 256, consuming systems 258, first side pitot probe 262, first side static port 264, second side pitot probe 266, second side static port 268, air data module 270, air data module 272, and air data module 274. Vehicle management computer 256 includes computing device 260.

First side pitot probe 262 is operably connected to air data module 274. Air data module 274 is operably connected to vehicle management computer 256. First side static port 264 is operably connected to air data module 274 and to second side static port 268. Air data module 274 is operably connected to vehicle management computer 256. Second side pitot probe 266 is operably connected to air data module 272. Air data module 272 is operably connected to vehicle management computer 256. Vehicle management computer 256 is operably connected to consuming systems 258.

In operation, first side pitot probe 262 and first side static port 264 collect pressure measurements from a first side of the aircraft. First side pitot probe 262 and first side static port 264 can be housed within a single pitot-static probe. Alternatively, first side pitot probe 262 and first side static port 264 can be spaced apart along the first side of the aircraft. Similarly, second side pitot probe 266 and second side static port 268 collect pressure measurements from a second side of the aircraft. Second side pitot probe 266 and second side static port 268 can be housed within a single pitot-static probe. Alternatively, second side pitot probe 266 and second side static port 268 can be spaced apart along the second side of the aircraft.

First side pitot probe 262 can transmit a measured impact pressure to air data module 270. Air data module 270 converts the pneumatic impact pressure into numerical information which can be sent along a data bus to vehicle management computer 256. Second side pitot probe 266 can transmit a measured impact pressure to air data module 272. First side static port 264 and second side static port 268 can transmit first side static pressure data and second side static pressure data respectively to vehicle management computer 256 via air data module 274. In some embodiments, the connection between any or all of first side pitot probe 262, first side static port 264, second side pitot probe 266, and second side static port 268 and vehicle management computer 256 is digital and hence no numerical conversion within a pneumatic connection is required.

Upon receiving the pressure measurements, vehicle management computer can execute the blockage detection algorithm housed within computing device 260. The blockage detection algorithm is executed as described above with respect to system 200. While it is understood that the blocking detection algorithm can be used on both the first side pitot probe 262 and the second side pitot probe 266, it is described with respect to the first side pitot probe 262 herein.

Computing device 260 generates a single correlating variable from the impact pressure and static pressure measurement received from first side pitot probe 262 and first side static port 264, respectively. Computing device 260 evaluates, via the blockage detection algorithm, whether a blockage condition exists within first side pitot probe 262 based upon whether the correlating variable exceeds a threshold indicative of a blockage. Computing device 260 can output a blockage indicator to consuming systems 258 upon detecting the blockage. Computing device 260 can then evaluate whether the blockage has cleared by evaluating whether the pressure measurement from an external aircraft probe is consistent with the measurements from pitot-static probe 102, and by evaluating the rate of change of the correlating variable. In the depicted embodiment, the external aircraft probe is second side static port 268. In other embodiments, additional external probes can be used to determine whether the blockage has cleared. Upon determining that the blockage has cleared, computing device 260 can output a clearance indicator to consuming systems 258.

Air data system architecture 250 is an additional embodiment of air data system architecture 200, depicting the blockage detection algorithm housed within vehicle management computer 256. As such, it provides many of the same advantages. Further, the depictions of architectures 200 and 250 demonstrate that the blockage detection algorithm can be implemented with or without pitot-static probes with in-built processing power, wherein in either architecture, no additional hardware is required.

Figure 3:
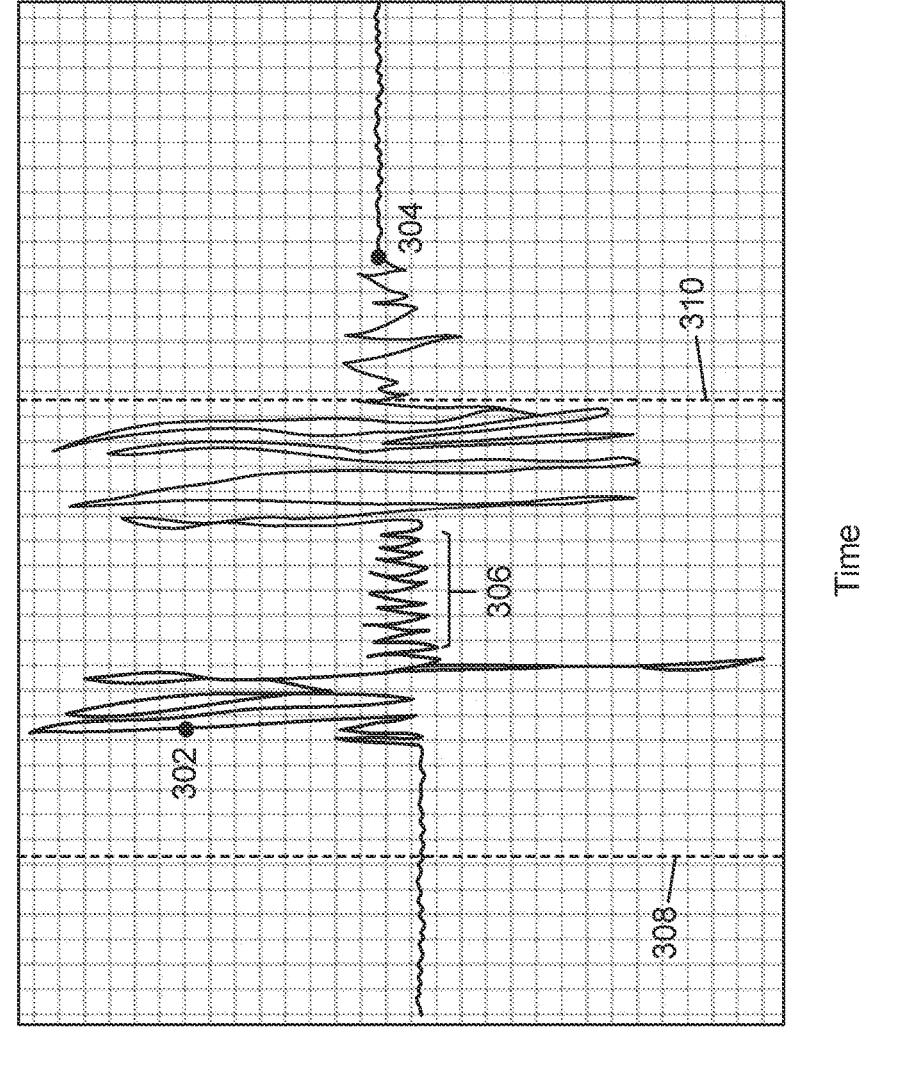
FIG. 3 is an example graph depicting a correlating variable response indicative of a blockage condition.

FIG. 3 is an example graph 300 depicting a correlating variable response indicative of a blockage condition. Graph 300 depicts the correlating variable as a function of time. As described, the correlating variable can be indicative of the rate of change of the static pressure divided by the impact pressure as measured by a pitot-static probe, or a separate pitot probe and static port.

As depicted in graph 300, the correlating variable can indicate a characteristic spike when a blockage occurs. Point 302 is indicative of a point where the correlating variable has exceeded the threshold indicative of a blockage and a blockage indicator is output (e.g., to consuming systems 106 of FIG. 1). The depicted threshold can be determined based on flight test data or flight simulation data and can be specific to the aircraft architecture and mounting locations of the probes.

In graph 300, point 304 depicts the point at which the blockage clearance signal is output (e.g., to consuming systems 106). As described with respect to FIGS. 1 and 2A-B, the clearance indicator can be output based upon a pressure received from an external sensor, such as a static pressure port mounted on an opposite side of the aircraft as compared to the probe being evaluated for a blockage. While the stabilization of the correlating variable value may be indicative of a blockage clearance, the external sensor data can function as a confirmation that the blockage is cleared. Because the correlating variable value is based on a rate of change, a stabilization, such as in region 306, can erroneously indicate a clearance when a clearance has not yet occurred.

Graph 300 also includes event start indicator 308 and event end indicator 310. Indicators 308 and 310 are intended to illustrate an example in which a probe can become blocked, and the resulting response of the correlating variable. In one example, event start indicator 308 is indicative of a pitot probe heater fault. In such an example, a heater within a pitot probe, which is designed to alleviate icing conditions to keep the pitot probe clear, is faulty. As depicted, the correlating variable value spikes shortly after such a fault, indicating that the probe is blocked due to ice accumulation. Event end indicator 310 can indicate a point in time at which the pitot probe heater fault is fixed, and the heater is once again functional. As depicted, the correlating variable value then stabilizes shortly after event end indicator 310, indicating that the rate of change of the pressure quotient (i.e., static pressure divided by impact pressure) is no longer fluctuating significantly.

The depiction of graph 300 is intended to show the analysis of the correlating variable with respect to time resulting in a blockage indicator. Graph 300 allows for data of a single variable resulting from the probe to be analyzed in order to determine if a blockage exists. Thus, graph 300 illustrates the benefits of system 100, particularly that system 100 is capable of determining probe blockages without need for reference to external parameters or sensors.

Figure 4:
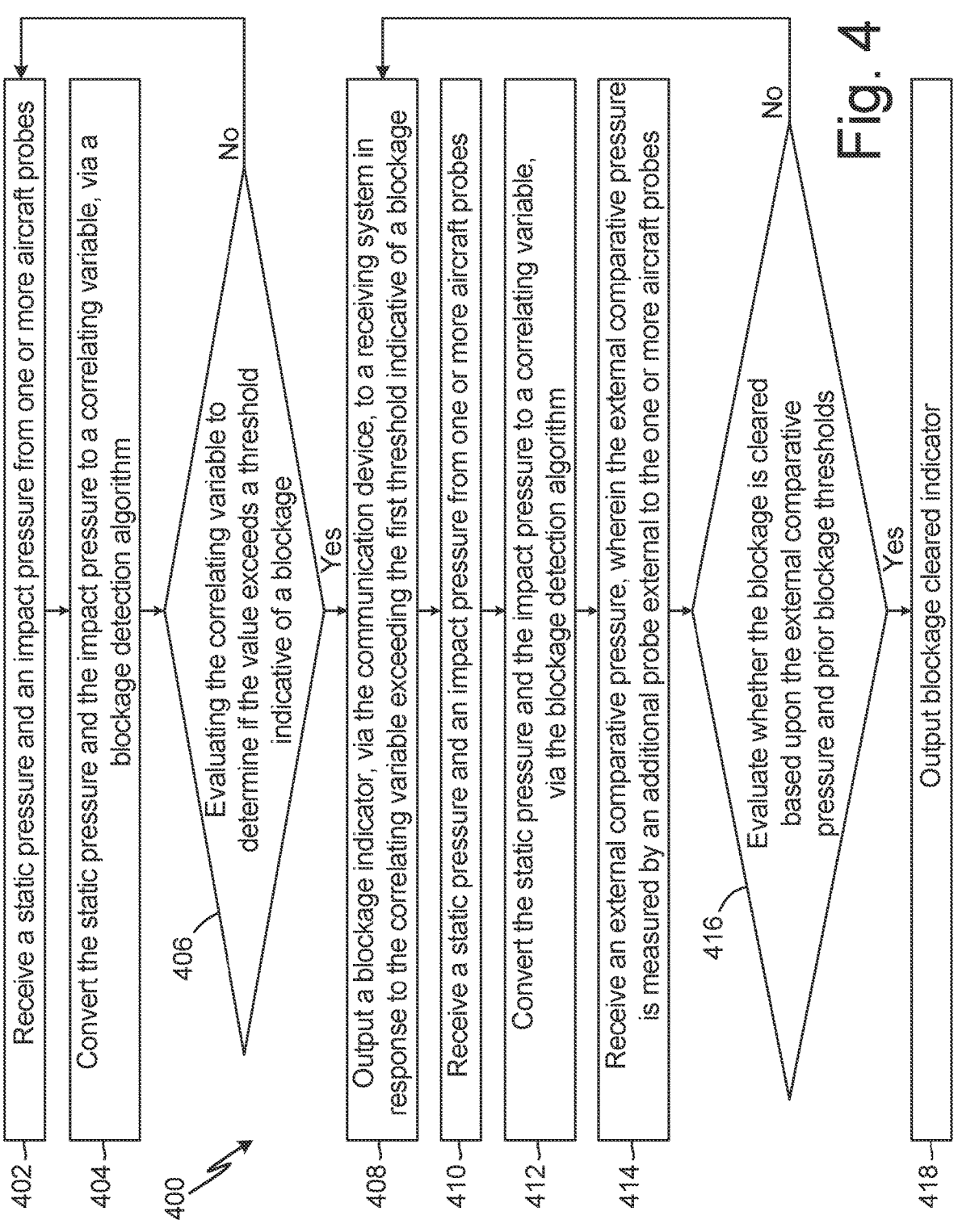
FIG. 4 is a flowchart depicting a method for detecting a blockage within a probe.

FIG. 4 depicts method 400, which is a method flowchart for detecting a blockage within a probe. In the description of method 400, reference will be made to the component numbers of system 100 for clarity.

Method 400 begins at step 402, wherein blockage detection system 104 receives a static pressure measurement and an impact pressure measurement from aircraft probe(s) 102 via communication device 110. As described, aircraft probe(s) 102 can be a pitot-static probe (e.g., with or without in-built processing power), a pitot probe and static port spaced apart, or any other probe configuration for measuring static and impact pressure.

At step 404, processor 108 converts the static pressure and the impact pressure into a correlating variable via the blockage detection algorithm. The correlating variable can be indicative of a rate of change of the static pressure divided by the impact pressure. The correlating variable can be further processed by converting the derivative of the static pressure divided by the impact pressure with respect to time into the frequency domain via power spectrum estimations, then removing nuisance or noise data.

At decision step 406, processor 108 evaluates the correlating variable to determine whether the value exceeds a threshold indicative of a blockage. The threshold indicative of a blockage can be based upon the aircraft configuration and/or the mounting location of the sensors on the aircraft. If the value of the correlating variable does not exceed the threshold indicative of a blockage, method 400 returns to step 402, wherein the static and impact pressure are again received from aircraft probe(s) 102. If the value of the correlating variable does exceed the threshold indicative of a blockage, method 400 proceeds to step 408.

At step 408, processor 108 outputs a blockage indicator, via communication device 110, to a receiving system, such as consuming systems 106 and/or a vehicle management computer.

At step 410, blockage detection system 104 receives a static pressure measurement and an impact pressure measurement from aircraft probe(s) 102 via communication device 110. At step 412, processor 108 converts the static pressure and the impact pressure into a correlating variable via the blockage detection algorithm.

At step 414, processor 108 receives an external comparative pressure, via communication device 110. The external comparative pressure is measured by an additional probe external to aircraft probe(s) 102. In the example of FIG. 2A, wherein multi-function probe 202 is the probe experiencing the blockage, multi-function probe 204 can be the additional external probe. In some embodiments, the external comparative pressure is measured by a probe mounted on the opposite side of the aircraft as compared to the probe experiencing the blockage. In some embodiments, the external comparative pressure is a static pressure, measured by a static pressure port.

At decision step 416, processor 108 evaluates whether the blockage is cleared based upon the external comparative pressure and based upon prior blockage thresholds. If the blockage is not cleared, method 400 returns to step 408, wherein an additional static pressure and impact pressure measurement is received for calculation of an updated correlating variable. If the blockage is cleared, method 400 continues to step 418.

At step 418, processor 108 outputs a blockage cleared indicator, via communication device 110, to consuming systems 106 and/or a vehicle management computer.

Overall, the techniques of this disclosure provide a system and method for evaluating a blockage within an aircraft probe. The disclosed techniques allow for a probe blockage algorithm to be installed within an existing pitot-static probe or vehicle management computer, thereby relieving the need for any additional hardware to be installed on an aircraft. The techniques of this disclosure are further able to be tailored to the aircraft configuration and probe mounting locations by adjusting the threshold indicative of a probe blockage based upon such factors (e.g., via flight test data or simulation data). The techniques of this disclosure also permit detection of probe blockages without any need for external measured and/or calculated air data parameters across additional channels.

DISCUSSION OF POSSIBLE EMBODIMENTS

The following are non-exclusive descriptions of possible embodiments of the present invention.

A blockage detection system for detecting aircraft probe blockages includes a processor. The system further includes a communication device operably connected to the processor. The system further includes computer-readable memory operably connected to the processor, the computer-readable memory encoded with instructions that, when executed by the processor, cause the system to perform the following steps. The system receives a static pressure and an impact pressure from one or more aircraft probes. The system converts the static pressure and the impact pressure to a correlating variable, via a blockage detection algorithm. The system evaluates the correlating variable, via the blockage detection algorithm, to determine if a value of the correlating variable exceeds a threshold indicative of a blockage. The system outputs a blockage indicator, via the communication device, to a receiving system in response to the correlating variable exceeding the first threshold indicative of a blockage.

The system of the preceding paragraph can optionally include, additionally and/or alternatively, any one or more of the following features, configurations and/or additional components:

A further embodiment of the foregoing system, wherein the computer-readable memory is further encoded with instructions that, when executed by the one or more processors, cause the system to receive an external comparative pressure, wherein the external comparative pressure is measured by an additional probe external to the one or more aircraft probes; and evaluate whether the blockage is cleared based upon the external comparative pressure.

A further embodiment of any of the foregoing systems, wherein the additional probe external to the one or more aircraft probes is a static pressure port mounted on an opposite side of the aircraft from a mounting location of the one or more aircraft probes.

A further embodiment of any of the foregoing systems, wherein the blockage detection system is housed within the one or more aircraft probes.

A further embodiment of any of the foregoing systems, wherein the one or more aircraft probes are pitot-static probes, the pitot-static probes comprising an internal air data computer.

A further embodiment of any of the foregoing systems, wherein the one or more aircraft probes include a pitot tube and a static pressure port, the pitot tube and the static pressure port being spaced apart from each other and mounted on the side of an aircraft.

A further embodiment of any of the foregoing systems, wherein the one or more aircraft probes include a pitot-static probe comprising a pitot tube and a static port.

A further embodiment of any of the foregoing systems, wherein the blockage detection system is housed within a vehicle management computer.

A further embodiment of any of the foregoing systems, wherein the vehicle management computer is digitally connected to the communication device.

A further embodiment of any of the foregoing systems, wherein the computer-readable memory is further encoded with instructions that, when executed by the one or more processors, cause the system to convert the correlating variable to the frequency domain; and remove, via the blockage detection algorithm, nuisance data, the nuisance data determined by examining flight test data.

A further embodiment of any of the foregoing systems, wherein the correlating variable is calculated, in part, by dividing the static pressure by the impact pressure.

A further embodiment of any of the foregoing systems, wherein the correlating variable is calculated, in part, by evaluating the derivative of the static pressure divided by the impact pressure with respect to time.

A further embodiment of any of the foregoing systems, wherein the correlating variable is calculated, in part, by converting the derivative of the static pressure divided by the impact pressure with respect to time to the frequency domain via power spectrum estimations.

A further embodiment of any of the foregoing systems, wherein the threshold indicative of the blockage is determined by evaluating flight test data and flight simulation data.

A further embodiment of any of the foregoing systems, wherein the threshold indicative of the blockage is specific to an architecture of the aircraft and to a mounting location of the one or more aircraft probes.

A method for detecting aircraft probe blockages includes receiving a static pressure and an impact pressure from one or more aircraft probes. The method further includes converting the static pressure and the impact pressure to a correlating variable, via a blockage detection algorithm. The method further includes evaluating the correlating variable, via the blockage detection algorithm, to determine if a value of the correlating variable exceeds a threshold indicative of a blockage. The method further includes outputting a blockage indicator, via the communication device, to a receiving system in response to the correlating variable exceeding the first threshold indicative of a blockage.

A further embodiment of the foregoing method, further including receiving an external comparative pressure, wherein the external comparative pressure is measured by an additional probe external to the one or more aircraft probes. The method further includes evaluating whether the blockage is cleared based upon the external comparative pressure.

A further embodiment of any of the foregoing methods, wherein the additional probe external to the one or more aircraft probes is a static pressure port mounted on an opposite side of the aircraft from a mounting location of the one or more aircraft probes.

A further embodiment of any of the foregoing methods, wherein the blockage detection system is housed within the one or more aircraft probes.

A further embodiment of any of the foregoing methods, wherein the one or more aircraft probes are pitot-static probes, the pitot-static probes comprising an internal air data computer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A blockage detection system for detecting aircraft probe blockages, the system comprising:
   a processor;
   a communication device operably connected to the processor;
   computer-readable memory operably connected to the processor, the computer-readable memory encoded with instructions that, when executed by the processor, cause the system to:
      receive a static pressure and an impact pressure from one or more aircraft probes;

convert the static pressure and the impact pressure to a correlating variable, via a blockage detection algorithm;

evaluate the correlating variable, via the blockage detection algorithm, to determine if a value of the correlating variable exceeds a threshold indicative of a blockage; and output a blockage indicator, via the communication device, to a receiving system in response to the correlating variable exceeding the first threshold indicative of a blockage.

2. The system of claim 1, wherein the one or more aircraft probes include a pitot tube and a static pressure port, the pitot tube and the static pressure port being spaced apart from each other and mounted on the side of an aircraft.

3. The system of claim 1, wherein the one or more aircraft probes include a pitot-static probe comprising a pitot tube and a static port.

4. The system of claim 1, wherein the computer-readable memory is further encoded with instructions that, when executed by the one or more processors, cause the system to:

convert the correlating variable to the frequency domain; and remove, via the blockage detection algorithm, nuisance data, the nuisance data determined by examining flight test data.

5. The system of claim 1, wherein the threshold indicative of the blockage is determined by evaluating flight test data and flight simulation data.

6. The system of claim 1, wherein the threshold indicative of the blockage is specific to an architecture of the aircraft and to a mounting location of the one or more aircraft probes.

7. The system of claim 1, wherein the computer-readable memory is further encoded with instructions that, when executed by the one or more processors, cause the system to:

receive an external comparative pressure, wherein the external comparative pressure is measured by an additional probe external to the one or more aircraft probes; and evaluate whether the blockage is cleared based upon the external comparative pressure.

8. The system of claim 7, wherein the additional probe external to the one or more aircraft probes is a static pressure port mounted on an opposite side of the aircraft from a mounting location of the one or more aircraft probes.

9. The system of claim 1, wherein the blockage detection system is housed within the one or more aircraft probes.

10. The system of claim 9, wherein the one or more aircraft probes are pitot-static probes, the pitot-static probes comprising an internal air data computer.

11. The system of claim 1, wherein the blockage detection system is housed within a vehicle management computer.

12. The system of claim 11, wherein the vehicle management computer is digitally connected to the communication device.

13. The system of claim 1, wherein the correlating variable is calculated, in part, by dividing the static pressure by the impact pressure.

14. The system of claim 13, wherein the correlating variable is calculated, in part, by evaluating the derivative of the static pressure divided by the impact pressure with respect to time.

15. The system of claim 14, wherein the correlating variable is calculated, in part, by converting the derivative of the static pressure divided by the impact pressure with respect to time to the frequency domain via power spectrum estimations.

16. A method for detecting aircraft probe blockages, the method comprising:

receiving a static pressure and an impact pressure from one or more aircraft probes;

converting the static pressure and the impact pressure to a correlating variable, via a blockage detection algorithm;

evaluating the correlating variable, via the blockage detection algorithm, to determine if a value of the correlating variable exceeds a threshold indicative of a blockage; and outputting a blockage indicator, via a communication device, to a receiving system in response to the correlating variable exceeding the first threshold indicative of a blockage.

17. The method of claim 16, further comprising:

receiving an external comparative pressure, wherein the external comparative pressure is measured by an additional probe external to the one or more aircraft probes; and evaluating whether the blockage is cleared based upon the external comparative pressure.

18. The method of claim 17, wherein the additional probe external to the one or more aircraft probes is a static pressure port mounted on an opposite side of the aircraft from a mounting location of the one or more aircraft probes.

19. The method of claim 16, wherein the blockage detection system is housed within the one or more aircraft probes.

20. The method of claim 19, wherein the one or more aircraft probes are pitot-static probes, the pitot-static probes comprising an internal air data computer.

* * * * *